United States Patent [19]

Millgardh et al.

[11] 4,188,248
[45] Feb. 12, 1980

[54] PRODUCING A CONTINUOUS FLEXIBLE SHEET COVERING MATERIAL FOR WRAPPING HEAT, COLD AND SOUND INSULATION

[75] Inventors: Ulf J. Millgardh, Stora Mellosa; Ulf W. Lindberg, Orebro; Weimar A. Anneflod, Orebro; Nils H. Werner, Orebro; Björn Wimelius, Orebro, all of Sweden

[73] Assignee: Orebro Pappersbruks AB, Orebro, Sweden

[21] Appl. No.: 884,299

[22] Filed: Mar. 7, 1978

[30] Foreign Application Priority Data

Mar. 14, 1977 [SE] Sweden .............................. 7702865

[51] Int. Cl.² ............................................ B32B 31/08
[52] U.S. Cl. .................................... 156/164; 156/309; 156/324; 156/244.22; 156/244.11; 156/244.24; 156/229; 427/209; 428/513; 428/464
[58] Field of Search ................... 156/309, 324, 244.22, 156/244.11, 244.24, 164, 160, 229; 407/209

[56] References Cited

U.S. PATENT DOCUMENTS

| | | | |
|---|---|---|---|
| 2,714,571 | 8/1955 | Irion et al. | 156/244.24 |
| 3,058,863 | 10/1962 | Gaines et al. | 156/244.11 X |
| 3,388,019 | 6/1968 | Thigpen | 156/282 |
| 3,526,000 | 8/1970 | Williams | 156/244.22 X |

*Primary Examiner*—P. C. Ives

*Attorney, Agent, or Firm*—Sughrue, Rothwell, Mion, Zinn and Macpeak

[57] ABSTRACT

To insulate piping against passage of heat, cold and sound, there are used inter alia preformed insulating sleeves, wrapped glass or rock wool material etc. A continuous sheet-like, flexible covering material in the form of a semi-finished product is used for wrapping round the insulation, said product consisting of a multi-layer laminate containing at least two layer groups, the first group forms the outer part of the sheet material when rolled up, and contains a supporting layer consisting of a kraft paper or the like with minor extensibility, and is covered on its outwardly facing surface with a polyethylene layer and similarly on its inner surface with a polyethylene or glue layer while the second group, that forms the inner part of the material when rolled up, contains a layer consisting of a highly extensible paper or the like, which is given a contracting tendency due to its striving to return to its original shape, by being given a high tensional load during manufacture. The highly extensible paper has a polyethylene or glue layer on its surface facing towards the first layer group, said layer being bonded to the corresponding layer in the first layer group or constituting said layer. On its surface, facing the opposite direction, it is protected by a polyethylene layer. Both layer groups are bonded to each other such that the sheet material has an enduring precurvature, characteristic for the sheet material, which thus fits snugly round insulations of different diameters.

4 Claims, 1 Drawing Figure

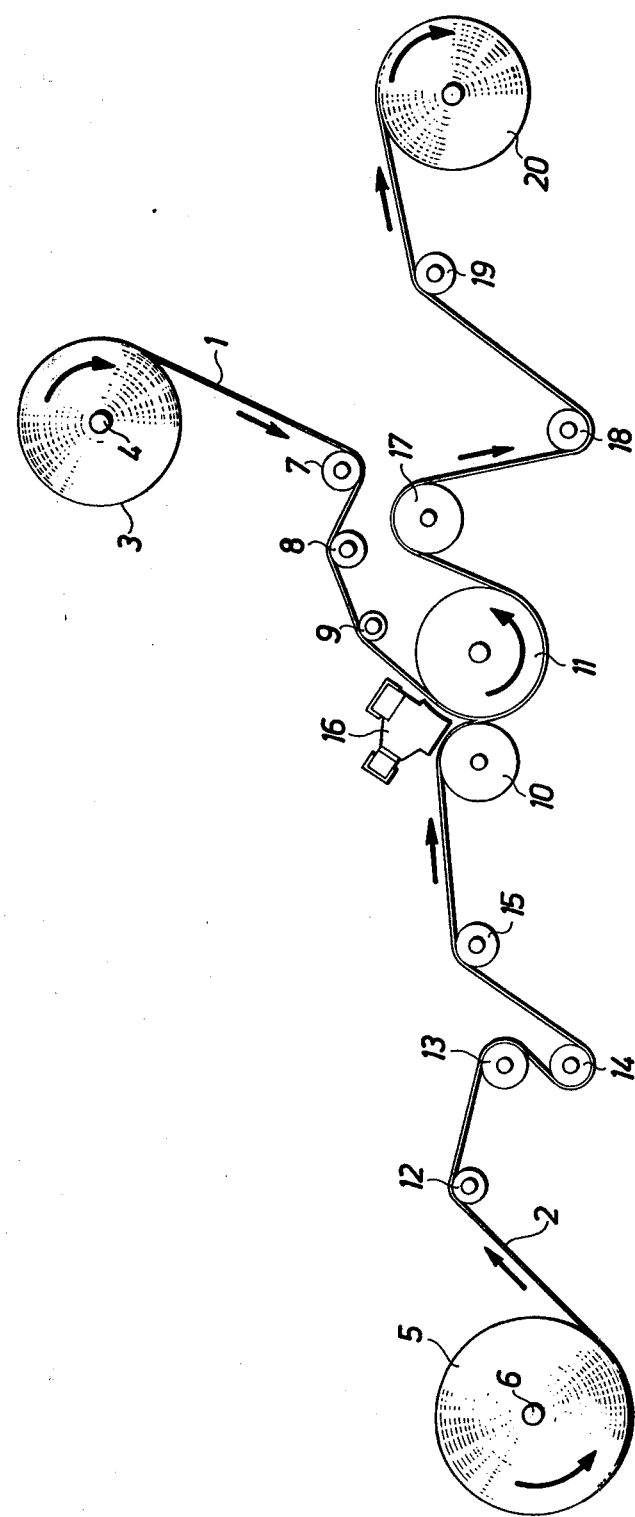

PRODUCING A CONTINUOUS FLEXIBLE SHEET COVERING MATERIAL FOR WRAPPING HEAT, COLD AND SOUND INSULATION

To insulate piping against the passage of heat, cold and sound, there are used inter alia preformed insulating sleeves of suitable thickness and material, such as cork waste, foam plastics, wrapped glass or rock wool material etc. The sleeves are often made in halves, placed against the piping and thereafter fastened into place with the help of plastics strips or glue. To a large extent, insulating consisting of rock wool, glass wool or kieselguhr is placed round the piping, and after being temporarily attached to the piping this insulation is covered by means of a flexible polyvinyl chloride film having a thickness of less than 0.5 mm. This film is given a certain curling tendency by the plastic film web (coiled up on a reel core) being kept in a heating cupboard for some time, or by treating the surface of the web lying inward on the roll with a suitable solvent. As a result of its curling tendency, the described plastic film fits snugly round insulations of different diameters and can then be stapled or glued together to form the intended wrapping.

The method mentioned first here is especially suitable for pipe bends and more irregularly shaped piping, while the latter method is very serviceable for straight piping. It has, however, a disadvantage in that the PVC-material used is not a fire retardant and if it is exposed to fire it generates very corrosive hydrochloric acid vapor and chlorine gas, which can cause extensive damage in the premises where piping is insulated in such a way.

Especially serious damage can naturally occur in workshops where there are expensive machine tools.

The object of the present invention is to circumvent this disadvantage, and relates to a continuous, sheet-like, flexible covering material intended as a semi-finished product for wrapping heat, cold or sound insulation on piping.

The invention mainly consists in that the continuous sheet-like covering material (sheet material) consists of a multilayer laminate containing at least two layer groups, of which the first group (forming the outside portion of the sheet material when it is coiled up) contains a supporting layer consisting of a kraft paper or the like with a small amount of stretch, this paper being covered on its outwardly facing surface by a polyethylene layer and similarly on its inward surface by a polyethylene layer or by a glue layer. The other group (forming the inner portion when the material is coiled up) contains a layer of highly extensible paper or the like, highly extensible kraft paper which, by high tensional loading during manufacture, is given a contracting tendency caused by its striving to regain its shape, the highly extensible paper having on its surface facing the first layer group a polyethylene layer or glue layer, which is bonded to the corresponding layer in the first layer group, or consists of said layer, and on its opposite side it is protected by a polyethylene layer, both layer groups being bonded to each other so that the sheet material has an enduring free curvature, which is characteristic for it.

According to one embodiment of the invention, the sheet material has a further layer of metal foil, e.g. an aluminum foil, applied to its outermost layer.

The invention also has the object of producing such a continuous, sheet-like, flexible covering material, generally distinguished in that the multilayer laminate is composed of at least two layer groups kept together by a binder, e.g. polyethylene, the first layer group (forming the outer portion of the finished material when it is coiled up) containing a supporting layer, e.g. consisting of kraft paper, which is kept under minimum tensional stress during the lamination process and which under said process has its outwardly facing side provided with a polyethylene layer, simultaneously with its inside also being provided with such a layer or a glue layer, while in the other group (forming the inner portion of the finished material when it is coiled up) there is introduced a layer of highly extensible paper or the like, which is subjected to such a high tensional stress during the lamination process that at least a quarter of the stretching ability of the material is utilized; that the highly extensible paper is provided with a polyethylene layer on either side, and together with the first layer group is introduced into a roll nip and that both layer groups are pressed together in the roll nip with the extensible paper or the like in an extended condition within its elastic limit, with the intention of giving the laminate a propensity to roll up, as a result of the contracting tendency caused by its striving to return to its original shape.

In this manner there is obtained according to the invention a laminate where, at the moment of lamination, one side has been exposed to a greater specific tensional force than the other and thereby has become more stretched. As a result of this, the most stretched side contracts more than the other in a free condition, resulting in the laminate curling up. As is stated above, there is the condition that at least one side consists of an elastic material, e.g. paper, having the capacity of being stretched when subjected to a tensional force and which strives to regain its original shape when the tensional force ceases. The greater the stretching and elastic characteristics a material have, the greater will the curling effect be. The different tensional forces are thereby regulated in a plastics coating machine, with the aid of the braking equipment associated with the machine.

The invention will now be more closely described in conjunction with the attached FIGURE of the drawing, which schematically illustrates the function of a plastics coating machine.

The portion denoted 1 of the final sheet material, described above as the first layer group, is assumed to have been already produced in a machine in an earlier part of the production line, this machine not being shown on the FIGURE. In said machine the part 1 has been coiled up to a supply roll 3, mounted on a shaft 4 in the machine illustrated on the FIGURE.

The portion denoted by 2 of the final sheet material, described above as the second layer group, is also assumed to have been produced in a machine arranged earlier in the production 9 and which is not shown on the FIGURE either. In said machine, the portion 2 has also been coiled up to a supply roll 5, mounted on a shaft 6 in the machine illustrated on the FIGURE.

The portions of part webs 1 and 2 are taken through the plastics coating machine in the following way.

The part web 1 runs from the roll 3 over the idlers 7 and 8, over the guide roll 9 and through a roll nip between the laminating rolls 10 and 11.

The part web 2 is taken over an idler 12, a pair of S-bend rolls 13, 14, a guide roll 15 and over the laminating roll 10 to the roll nip between this roll and the laminating roll 11.

Both part webs 1 and 2 are joined together by a polyethylene layer at the roll nip, this layer being supplied to the nip from an extruder 16, and in the form of a thin curtain of heated liquid polyethylene extending in the longitudinal direction of the roll nip.

The finished laminate web pressed together in the roll nip is taken round the larger of the laminating rollers 11, also constituting a cooling roller, over a pair of idlers 17, 18 and over a guide roll 19 to coiling, where the finished sheet laminate 20 is coiled on a reel core of about 300 mm diameter for a width of 1500 mm or more. The maximum width which the machine will take is 2450 mm. The ready-coiled laminate web can have a diameter at the start of unrolling of from 150 to 200 mm (maximum diameter 1500 mm).

The schematically indicated plastics coating machine is driven at the S-bend rolls, and at the roll of finished material.

By braking the part web containing the extensible paper at the supply roll 5 (arranged on the shaft) and at the S-bend rolls 13, 14, while the part webs are running through the machine, regulation of the tensional stress in the layer group 2, which is subjected to extension, is possible in such a way that in the finished laminate beyond the nip between the rolls 10 and 11 there is obtained a return of the stretched layer group 2 to its original shape, when the tensional force is reduced, during the movement over the cooling roll, an enduring curving effect on the finished sheet material 20 being thus obtained when the tensional force ceases entirely.

The part web 1 can also be provided with a further layer of metal foil, e.g. an aluminium foil, on its outer side.

A pair of embodiments according to the invention will now be described.

EXAMPLE 1

Sheet laminate for wrapping pipe insulation without the requirement of fire retarding effect The sheet material is produced according to the description above, and from the outside and inwards it will be built up in the following way:

I. a layer of low-density polyethylene with a weight of 20 g/m$^2$

II. a layer of bleached, machine-glazed kraft paper with a weight of about 100 g/m$^2$ III. a layer of low-density polyethylene with a weight of about 15 g/m$^2$ IV. a layer of unglazed highly extensible kraft paper with a weight of about 90–135 g/m$^2$ V. a layer of low-density polyethylene with a weight of about 15 g/m$^2$.

EXAMPLE 2

Sheet material for wrapping pipe insulation with the requirement of fire retarding effect This sheet material is manufactured in a similar way to that previously described in conjunction with the drawing, but the part web 1 now also contains an aluminium foil which, in a similar way as the part web 1 built up with a machine-glazed paper, is taken over the rolls 7–9 and into the nip between the pressure roll 10 and pressure roll 11 in the laminator. In this way a sheet material is obtained which, starting from the outside and working inwards, is built up in the following way:

I. an aluminium foil with a weight of 32 g/m$^2$

II. a glue or low density layer of polyethylene with a weight of 20 g/m$^2$

III. a kraft paper with a weight of about 100 g/m$^2$

IV. a low-density polyethylene with a weight of 15 g/m$^2$

V. unbleached, unglazed highly extensible kraft paper with a weight of about 135 g/m$^2$ VI. a low-density polyethylene with a weight of 15 g/m$^2$.

It is suitable to convert large rolls of finished material to smaller rolls for direct use.

Although the invention has been described in conjunction with a pair of embodiments thereof, it can be varied and remain within the scope of the following claims.

What is claimed is:

1. A method of producing a continuous, sheet-like, flexible covering material intended for wrapping round heat, cold or sound insulation on piping and the like, said multilayer laminate being composed of at least two layer groups, bonded together by a binder, which also forms the outer part of the finished material as it is rolled up, said at least two layer groups including a first layer group containing a supporting layer of kraft paper and a second layer group of highly extensible kraft paper, said method comprising the steps of:

keeping said first layer group containing the supporting layer of kraft paper under minimum tensional stress in the order of magnitude of 1.5 N/cm sheet width, providing said first layer group with a polyethylene layer on its outwardly facing surface while simultaneously providing said first layer group on its inside surface with a bonding material layer, exposing said layer of highly extensible kraft paper of said second layer group which is exposed to a high tensional stress during lamination with said first layer group by utilizing at least a quarter of the stretching ability of the highly extensible kraft paper, said process further comprising applying a polyethylene layer to both sides of the highly extensible kraft paper and passing together with the first layer group said second layer group into a roll nip such that both layer groups are pressed together with the extensible paper in a stretched condition within its elastic limits to produce a laminate having a tendency to curl up as a result of the contracting tendency caused by the extensible paper striving to regain its original shape.

2. A method according to claim 1, wherein said sheet material is compounded by the layer groups running over S-bend rolls from different uncoiling places and being put together in a nip between a pair of laminating rollers for simultaneous lamination by the aid of said binder, and wherein said second layer group containing said stretchable paper is exposed during lamination to high tensional stress by applying braking forces to said S-bend rolls.

3. A method according to claim 2, wherein said polyethylene binder is applied between said different layers by a laminator arranged over the roll nip, and wherein said polyethylene is heated to liquid form and applied in the shape of a thin curtain extending in the longitudinal direction of the roll nip.

4. A method according to claim 1, further comprising the step of supplying a web from one unrolling location to said roll nip comprising a laminate of paper and aluminum foil, such that said foil increases precurvature by its lack of extensibility and further functions as a fire retardant to said laminated continuous sheetlike flexible covering material.

* * * * *